US008640139B2

(12) United States Patent
Yagi (10) Patent No.: US 8,640,139 B2
(45) Date of Patent: Jan. 28, 2014

(54) SYSTEM DEPLOYMENT DETERMINATION SYSTEM, SYSTEM DEPLOYMENT DETERMINATION METHOD, AND PROGRAM

(75) Inventor: Shinjiro Yagi, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/504,855

(22) PCT Filed: Oct. 15, 2010

(86) PCT No.: PCT/JP2010/006130
§ 371 (c)(1),
(2), (4) Date: Apr. 27, 2012

(87) PCT Pub. No.: WO2011/052149
PCT Pub. Date: May 5, 2011

(65) Prior Publication Data
US 2012/0221900 A1    Aug. 30, 2012

(30) Foreign Application Priority Data
Oct. 29, 2009 (JP) ................................ 2009-248950

(51) Int. Cl.
*G06F 9/46* (2006.01)
*G06F 15/173* (2006.01)

(52) U.S. Cl.
USPC ........... 718/104; 718/105; 709/223; 709/224; 709/225; 709/226

(58) Field of Classification Search
USPC ........................................................ 718/104
See application file for complete search history.

(56) References Cited

U.S. PATENT DOCUMENTS

| 7,568,199 B2* | 7/2009 | Bozak et al. ................... 718/104 |
| 2004/0064349 A1* | 4/2004 | Humenansky et al. ........... 705/7 |
| 2005/0066331 A1* | 3/2005 | Inoue et al. .................... 718/104 |
| 2007/0225948 A1* | 9/2007 | Takezawa et al. ................ 703/1 |
| 2008/0165686 A1* | 7/2008 | Lake et al. ...................... 370/231 |
| 2008/0222289 A1* | 9/2008 | Conway et al. ................. 709/225 |
| 2008/0301255 A1* | 12/2008 | He et al. ......................... 709/214 |
| 2009/0070771 A1* | 3/2009 | Yuyitung et al. ............... 718/105 |
| 2009/0089370 A1* | 4/2009 | Hodges et al. ................. 709/203 |

FOREIGN PATENT DOCUMENTS

| JP | 07-152809 A | 6/1995 |
| JP | 2005-309868 A | 11/2005 |
| JP | 2005-316696 A | 11/2005 |
| JP | 02005309868 A * | 11/2005 ............ G06F 15/177 |
| JP | 2006-343899 A | 12/2006 |
| JP | 2008-171234 A | 7/2008 |

* cited by examiner

*Primary Examiner* — Abdullah Al Kawsar
(74) *Attorney, Agent, or Firm* — Sughrue Mion, PLLC (57) ABSTRACT

A system deployment determination system is provided that can appropriately define the number of information processing apparatuses that satisfies availability defined in a Service Level Agreement as the number of information processing apparatuses used in a target system to be configured. The list generating means generates a list including information processing apparatuses of which failure rates are less than the failure rate defined, and searches an information processing apparatus. The apparatus number determining means calculates a number of information processing apparatuses required to satisfy the amount of requested processing during normal operation. On condition that the number of information processing apparatuses thus calculated can be allocated from the searched information processing apparatus used independently or the searched information processing apparatus group forming the cluster, the number of information processing apparatuses thus calculated is adopted as the number of information processing apparatuses used in the target system to be configured.

9 Claims, 7 Drawing Sheets

FIG. 2

| SERVER NAME | FAILURE RATE | CLUSTER METHOD INFORMATION | PROCESSING AMOUNT | COST | USAGE INFORMATION |
|---|---|---|---|---|---|
| SERVER 51 | 1.4% | INDEPENDENT | 1000Tx/S | 10000 | IN USE |
| SERVER 52 | 1.4% | INDEPENDENT | 1000Tx/S | 10000 | NOT IN USE |
| SERVER 53 | 1.4% | INDEPENDENT | 1000Tx/S | 10000 | NOT IN USE |
| SERVER 54 | 0.33% | CLUSTER 1 | 1000Tx/S | 15000 | NOT IN USE |
| SERVER 55 | 0.33% | CLUSTER 1 | 1000Tx/S | 15000 | NOT IN USE |
| SERVER 56 | 0.33% | CLUSTER 1 | 1000Tx/S | 15000 | NOT IN USE |
| SERVER 57 | 0.03% | CLUSTER 2 | 1000Tx/S | 18000 | NOT IN USE |
| SERVER 58 | 0.03% | CLUSTER 2 | 1000Tx/S | 18000 | NOT IN USE |
| SERVER 59 | 0.03% | CLUSTER 2 | 1000Tx/S | 18000 | NOT IN USE |

| SERVER NAME | FAILURE RATE | CLUSTER METHOD INFORMATION | PROCESSING AMOUNT | COST | USAGE INFORMATION |
|---|---|---|---|---|---|
| SERVER 52 | 1.4% | INDEPENDENT | 1000Tx/S | 10000 | NOT IN USE |
| SERVER 53 | 1.4% | INDEPENDENT | 1000Tx/S | 10000 | NOT IN USE |
| SERVER 54 | 0.33% | CLUSTER 1 | 1000Tx/S | 15000 | NOT IN USE |
| SERVER 55 | 0.33% | CLUSTER 1 | 1000Tx/S | 15000 | NOT IN USE |
| SERVER 56 | 0.33% | CLUSTER 1 | 1000Tx/S | 15000 | NOT IN USE |
| SERVER 57 | 0.03% | CLUSTER 2 | 1000Tx/S | 18000 | NOT IN USE |
| SERVER 58 | 0.03% | CLUSTER 2 | 1000Tx/S | 18000 | NOT IN USE |
| SERVER 59 | 0.03% | CLUSTER 2 | 1000Tx/S | 18000 | NOT IN USE |

FIG. 6

| SERVER NAME | FAILURE RATE | CLUSTER METHOD INFORMATION | PROCESSING AMOUNT | COST | USAGE INFORMATION |
|---|---|---|---|---|---|
| SERVER 54 | 0.33% | CLUSTER 1 | 1000Tx/S | 15000 | NOT IN USE |
| SERVER 55 | 0.33% | CLUSTER 1 | 1000Tx/S | 15000 | NOT IN USE |
| SERVER 56 | 0.33% | CLUSTER 1 | 1000Tx/S | 15000 | NOT IN USE |
| SERVER 57 | 0.03% | CLUSTER 2 | 1000Tx/S | 18000 | NOT IN USE |
| SERVER 58 | 0.03% | CLUSTER 2 | 1000Tx/S | 18000 | NOT IN USE |
| SERVER 59 | 0.03% | CLUSTER 2 | 1000Tx/S | 18000 | NOT IN USE |

FIG. 7

SYSTEM DEPLOYMENT DETERMINATION SYSTEM, SYSTEM DEPLOYMENT DETERMINATION METHOD, AND PROGRAM

CROSS REFERENCE TO RELATED APPLICATION

This application is a National Stage of International Application No. PCT/JP2010/006130, filed on Oct. 15, 2010, which claims priority from JP 2009-248950, filed on Oct. 29, 2009, the contents of all of which are incorporated herein by reference in their entirety.

TECHNICAL FIELD

The present invention relates to a system deployment determination system, a system deployment determination method, and a system deployment determination program for determining deployment of a target system to be configured, and more particularly, to a system deployment determination system, a system deployment determination method, and a system deployment determination program for determining the number of information processing apparatuses satisfying a Service Level Agreement (SLA).

BACKGROUND ART

When a system is managed to satisfy a Service Level Agreement (hereinafter referred to as SLA), an administrator of the system manually determines a deployment plan of information processing apparatuses used for the system. In this case, the deployment means determining the number of information processing apparatuses used for the system. When availability is defined in the SLA, the number of information processing apparatuses is determined so that the availability rate of the service can be maintained with normally-operating information processing apparatuses even if failure occurs in some of information processing apparatuses in the system. Even in such a case, the administrator of the system manually determines the number of information processing apparatuses.

On the other hand, PLT 1 describes a configuration control method and a configuration control system for a Web system. In the configuration control method described in PLT 1, a processing ability limit value of a server is generated as a limit value table in advance. Then, in the configuration control system described in PLT 1, the types and the number of requests received by a business system (Web system) are measured, and recorded to a request distribution table. Further, the configuration control system described in PLT 1 compares and analyzes the number of requests in the request distribution table and the limit value in the limit value table, and when the configuration control system determines that it is necessary to add the resource on the basis of the amount of resource determined to be required based on the increase and the decrease of the number of requests, the configuration control system gives an instruction to assign the resource.

CITATION LIST

Patent Literature

PLT 1: Japanese Patent Application Laid-Open No. 2006-343899

SUMMARY OF INVENTION

Technical Problem

When availability is defined in the SLA, it is preferable, from the perspective of reducing the load imposed on the administrator of the system, to be able to automatically calculate the number of information processing apparatuses satisfying the availability.

According to the configuration control system described in PLT 1, the optimum number of servers according to the load of the business system can be deployed. However, the number of servers is determined on the basis of the number of requests that is actually measured, and the availability defined in the SLA is not taken into consideration. Therefore, it cannot be said that the availability defined in the SLA is necessarily satisfied.

Accordingly, it is an object of the present invention to provide a system deployment determination system, a system deployment determination method, and a system deployment determination program that can appropriately define the number of information processing apparatuses that satisfies availability defined in the SLA as the number of information processing apparatuses used in a target system to be configured.

Solution to Problem

A system deployment determination system according to the present invention includes: apparatus information storing means for storing, for each candidate information processing apparatus that may be employed by a target system to be configured, a record including a failure rate, cluster method information indicating whether the information processing apparatus is used independently or used in a cluster, an amount of processing, and a cost as an index value representing a price; list generating means, wherein when a Service Level Agreement is given that includes information with which a failure rate defined for the target system to be configured can be derived and an amount of requested processing during normal operation, i.e., an amount of processing required of the target system to be configured during normal operation, the list generating means generates at least a list including information processing apparatuses of which failure rates are less than the failure rate defined for the target system to be configured, and searches, from the list, an information processing apparatus used independently or an information processing apparatus group forming a cluster of which cost is the lowest; and apparatus number determining means for calculating a number of information processing apparatuses required to satisfy the amount of requested processing during normal operation on the basis of the amount of requested processing during normal operation and an amount of processing performed by the information processing apparatus used independently or the information processing apparatus group forming the cluster searched by the list generating means, wherein on condition that the number of information processing apparatuses thus calculated can be allocated from among the information processing apparatus used independently or the information processing apparatus group forming the cluster searched by the list generating means, the apparatus number determining means determines that the number of information processing apparatuses thus calculated is the number of information processing apparatuses used in the target system to be configured, and when the number of information processing apparatuses thus calculated cannot be allocated from among the information processing apparatus used independently or the information processing apparatus group forming the cluster searched by the list generating means, the apparatus number determining means causes the list generating means to search, from among an information processing apparatus or an information processing apparatus group that has not yet been searched, an information processing apparatus used independently or an information processing apparatus group forming a cluster of which cost is the lowest.

A system deployment determination method according to the present invention includes: storing, for each candidate information processing apparatus that may be employed by a target system to be configured, a record including a failure rate, cluster method information indicating whether the information processing apparatus is used independently or used in a cluster, an amount of processing, and a cost as an index value representing a price; when a Service Level Agreement is given that includes information with which a failure rate defined for the target system to be configured can be derived and an amount of requested processing during normal operation, i.e., an amount of processing required of the target system to be configured during normal operation, generating at least a list including information processing apparatuses of which failure rates are less than the failure rate defined for the target system to be configured, and searching, from the list, an information processing apparatus used independently or an information processing apparatus group forming a cluster of which cost is the lowest; and calculating a number of information processing apparatuses required to satisfy the amount of requested processing during normal operation on the basis of the amount of requested processing during normal operation and an amount of processing performed by the searched information processing apparatus used independently or the searched information processing apparatus group forming a cluster, wherein on condition that the number of information processing apparatuses thus calculated can be allocated from among the searched information processing apparatus used independently or the searched information processing apparatus group forming the cluster, the number of information processing apparatuses thus calculated is adopted as the number of information processing apparatuses used in the target system to be configured, and when the number of information processing apparatuses thus calculated cannot be allocated from among the searched information processing apparatus used independently or the searched information processing apparatus group forming the cluster, an information processing apparatus used independently or an information processing apparatus group forming a cluster of which cost is the lowest is searched from among an information processing apparatus or an information processing apparatus group that has not yet been searched.

A system deployment determination program according to the present invention is provided in a computer having apparatus information storing means for storing, for each candidate information processing apparatus that may be employed by a target system to be configured, a record including a failure rate, cluster method information indicating whether the information processing apparatus is used independently or used in a cluster, an amount of processing, and a cost as an index value representing a price, the system deployment determination program causing the computer to execute: list generating processing, wherein when a Service Level Agreement is given that includes information with which a failure rate defined for the target system to be configured can be derived and an amount of requested processing during normal operation, i.e., an amount of processing required of the target system to be configured during normal operation, the list generating processing generates at least a list including information processing apparatuses of which failure rates are less than the failure rate defined for the target system to be configured, and searches, from the list, an information processing apparatus used independently or an information processing apparatus group forming a cluster of which cost is the lowest; and apparatus number determining processing for calculating a number of information processing apparatuses required to satisfy the amount of requested processing during normal operation on the basis of the amount of requested processing during normal operation and an amount of processing performed by the information processing apparatus used independently or the information processing apparatus group forming the cluster searched by the list generating processing, wherein on condition that the number of information processing apparatuses thus calculated can be allocated from among the information processing apparatus used independently or the information processing apparatus group forming the cluster searched by the list generating processing, the number of information processing apparatuses thus calculated is adopted as the number of information processing apparatuses used in the target system to be configured, and when the number of information processing apparatuses thus calculated cannot be allocated from among the information processing apparatus used independently or the information processing apparatus group forming the cluster searched by the list generating processing, the list generating processing is executed again on an information processing apparatus or an information processing apparatus group that has not yet been searched.

Advantageous Effects of Invention

According to the present invention, the number of information processing apparatuses that satisfies availability defined in the SLA can be determined as the number of information processing apparatuses used in a target system to be configured.

DESCRIPTION OF EMBODIMENTS

Hereinafter, an embodiment of the present invention will be explained with reference to drawings.

Figure 1:
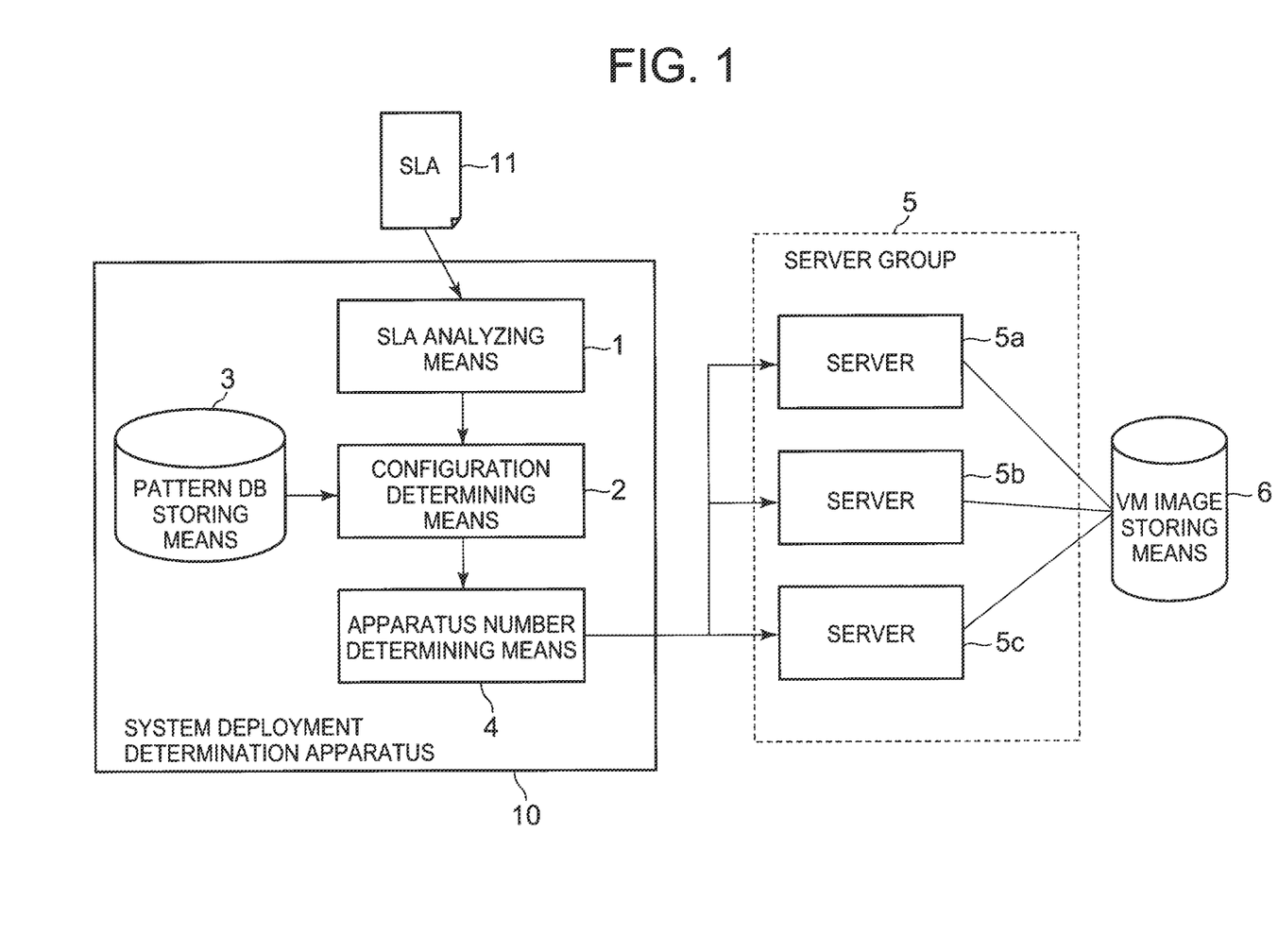
FIG. 1 is a block diagram illustrating an example of a system deployment determination system according to the present invention.

FIG. 1 is a block diagram illustrating an example of a system deployment determination system according to the present invention. A system deployment determination system according to the present invention includes a system deployment determination apparatus 10. In addition, the system deployment determination apparatus 10 includes SLA analyzing means 1, configuration determining means 2, pattern DB storing means 3, and apparatus number determining means 4.

In the present embodiment, a server group 5 is connected to the system deployment determination apparatus 10. The system deployment determination apparatus 10 determines the number of servers (information processing apparatuses) included in a target system to be configured, and gives the servers an instruction to operate as the target system to be configured. The target system to be configured means a system that is desired to be configured by a user of the system deployment determination apparatus 10. According to the instruction given by the system deployment determination apparatus 10, each of the servers 5a to 5c reads a Virtual Machine (VM) image from the VM image storing means 6, and operates according to the VM image.

Each of the servers 5a to 5c that belongs to the server group 5 is a candidate server that may be employed by the target system to be configured. The number of servers used in the target system to be configured is determined from these candidates by the system deployment determination apparatus 10. Therefore, the system deployment determination system according to the present invention may also be referred to as an information processing apparatus number determining system. In FIG. 1, three servers 5a to 5c are shown as candidates. However, the number of candidate servers that may be employed by the target system to be configured is not limited three. Alternatively, more servers may be prepared as the candidates.

The Service Level Agreement (SLA) 11 of the target system to be configured is input to the system deployment determination apparatus 10. The SLA 11 includes at least information from which a failure rate of the target system to be configured can be derived and the amount of processing required of the target system to be configured during normal operation. The amount of processing will be referred to as "the amount of requested processing". The SLA 11 may include the amount of processing required as the amount of processing to be processed by the target system to be configured even when failure occurs in some of the servers used in the target system to be configured. The amount of processing will be referred to as "the minimum amount of requested processing" so as to be distinguished from the amount of requested processing explained above.

When the SLA analyzing means 1 receives the SLA 11 of the target system to be configured, the SLA analyzing means 1 calculates the failure rate determined from the SLA 11. For example, it is assumed that the availability requested by the target system to be configured is described in the SLA 11. In this case, the failure rate can be expressed using expression (1) shown below.

$$\text{Failure rate}=100-\text{availability expression} \qquad (1)$$

Therefore, the SLA analyzing means 1 may calculate the failure rate by looking up the availability described in the SLA 11 and calculate according to the expression (1). However, in the expression (1), the failure rate and the availability are assumed to be expressed as percentages.

When the failure rate is described in the received SLA, the SLA analyzing means 1 may read the failure rate from the SLA 11.

The pattern DB storing means 3 is a storage device that stores, as a database, information about each candidate server that may be employed by the target system to be configured. This database will be hereinafter referred to as a pattern database (pattern DB).

Figure 2:
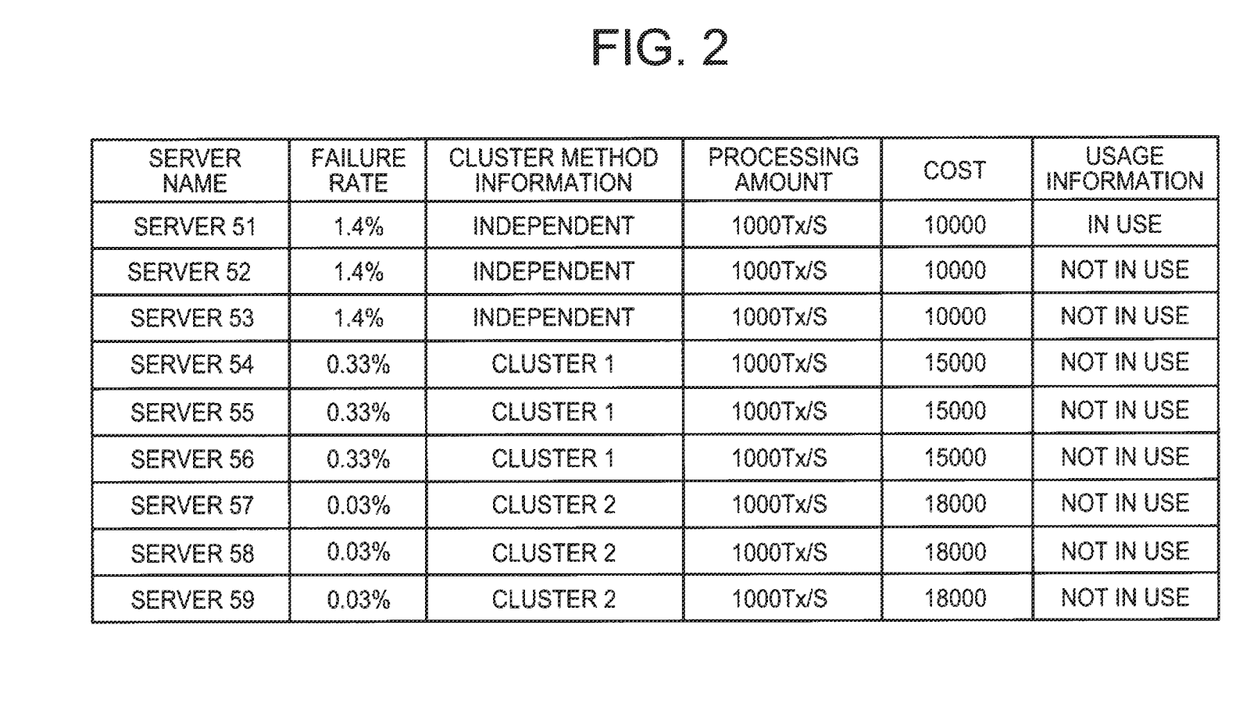
FIG. 2 is an explanatory diagram illustrating an example of a pattern DB.

FIG. 2 is an explanatory diagram illustrating an example of a pattern DB. The pattern DB storing means 3 stores a "server name", a "failure rate", "cluster method information", "the amount of processing", a "cost", "usage information", for each of the candidate servers that may be employed by the target system to be configured.

The "server name" is a server name of a server. In other words, the "server name" may also be called identification information about a server.

The "failure rate" is a failure rate of a server. The failure rate is different in accordance with the type and the reliability of the server (information processing apparatus).

The "cluster method information" indicates whether the server is used independently or used in a cluster. Further, when the server is used in the cluster, the "cluster method information" is information indicating identification information of the cluster to which the server belongs. For example, in the example as shown in FIG. 2, the server 51 is not used as the cluster but is used independently. Some or all of the servers 54 to 56 are used as one cluster ("cluster 1"). Likewise, some or all of the servers 57 to 58 are used as one cluster ("cluster 2").

"The amount of processing" indicates the amount of processing that can be processed by the server. In the example shown in FIG. 2, "the amount of processing" indicates "the number of transactions that can be processed per second" as an example. In FIG. 2, "the number of transactions that can be processed per second" is represented in a unit, "Tx/S".

The "cost" is an index value indicating the price of the server. The higher the value of the "cost" is, the higher the price of the server is, and the lower the value of the "cost" is, the lower the price of the server is.

The "usage information" is information indicating whether the server is already used in a system other than the target system to be configured.

For each of the candidate servers that may be employed by the target system to be configured, the pattern DB storing means 3 stores the "server name", the "failure rate", the "cluster method information", "the amount of processing", the "cost" and the "usage information".

The configuration determining means 2 generates a list of servers (deployment target list explained later), i.e., servers of which failure rates are less than the failure rate derived from the SLA but are not yet used in any system other than the target system to be configured. Further, the configuration determining means 2 compares the costs of each server used independently and each server group forming one cluster in the list, and searches the server or the server group of which cost is the lowest. It should be noted that the cost of the server group forming one cluster is a summation of costs of respective servers which belong to the server group.

The apparatus number determining means 4 calculates the number of information processing apparatuses that satisfies the amount of requested processing defined in the SLA 11 on the basis of the server or the server group searched by the configuration determining means 2, and determines whether the number of information processing apparatuses are allocated or not on the basis of the server or the server group searched. When the SLA 11 defines the minimum amount of requested processing and further there occurs failure in some of the server group searched, and the apparatus number determining means 4 determines that the amount of requested processing cannot be satisfied, the apparatus number determining means 4 calculates the number of information processing apparatuses with which the minimum amount of requested processing can be satisfied even if there occurs failure in some of the server group searched, and the apparatus number determining means 4 determines whether the number of information processing apparatuses is allocated in the searched server group. When the number of information processing apparatuses with which the amount of requested processing or the minimum amount of requested processing is satisfied is not allocated, the apparatus number determining means 4 causes the configuration determining means 2 to search a server or a server group of which cost is the second lowest to the server or the server group previously selected. In other words, the apparatus number determining means 4 causes the configuration determining means 2 to search the server or the server group of which cost is the lowest among the servers or the server groups that have not yet been searched.

When the number of information processing apparatuses satisfying the SLA 11 is determined to be allocated, the apparatus number determining means 4 adopts the number of information processing apparatuses as the number of servers used in the target system to be configured.

The apparatus number determining means 4 instructs the server that is determined to be used in the target system to be configured to read the VM image specifying operation as the target system to be configured.

The server receiving the instruction from the apparatus number determining means 4 reads the instructed VM image from the VM image storing means 6, and operates according to the VM image.

The VM image storing means 6 is a storage device storing the VM image. The VM image is an image file of a storage disk including an OS and software for the virtual machine. The VM image may be said to be a file including an OS (Operating System) and software for the virtual machine.

The SLA analyzing means 1, the configuration determining means 2, and the apparatus number determining means 4 are achieved with a CPU of a computer operating according to, for example, a system deployment determination program. In this case, for example, a program storage device (not shown) of the computer may store the system deployment determination program, and the CPU may read the program. In accordance with the program, the CPU may operate as the SLA analyzing means 1, the configuration determining means 2, and the apparatus number determining means 4. Alternatively, the SLA analyzing means 1, the configuration determining means 2, and the apparatus number determining means 4 may be respectively realized as separate units.

Subsequently, operation will be explained.

Figure 3:
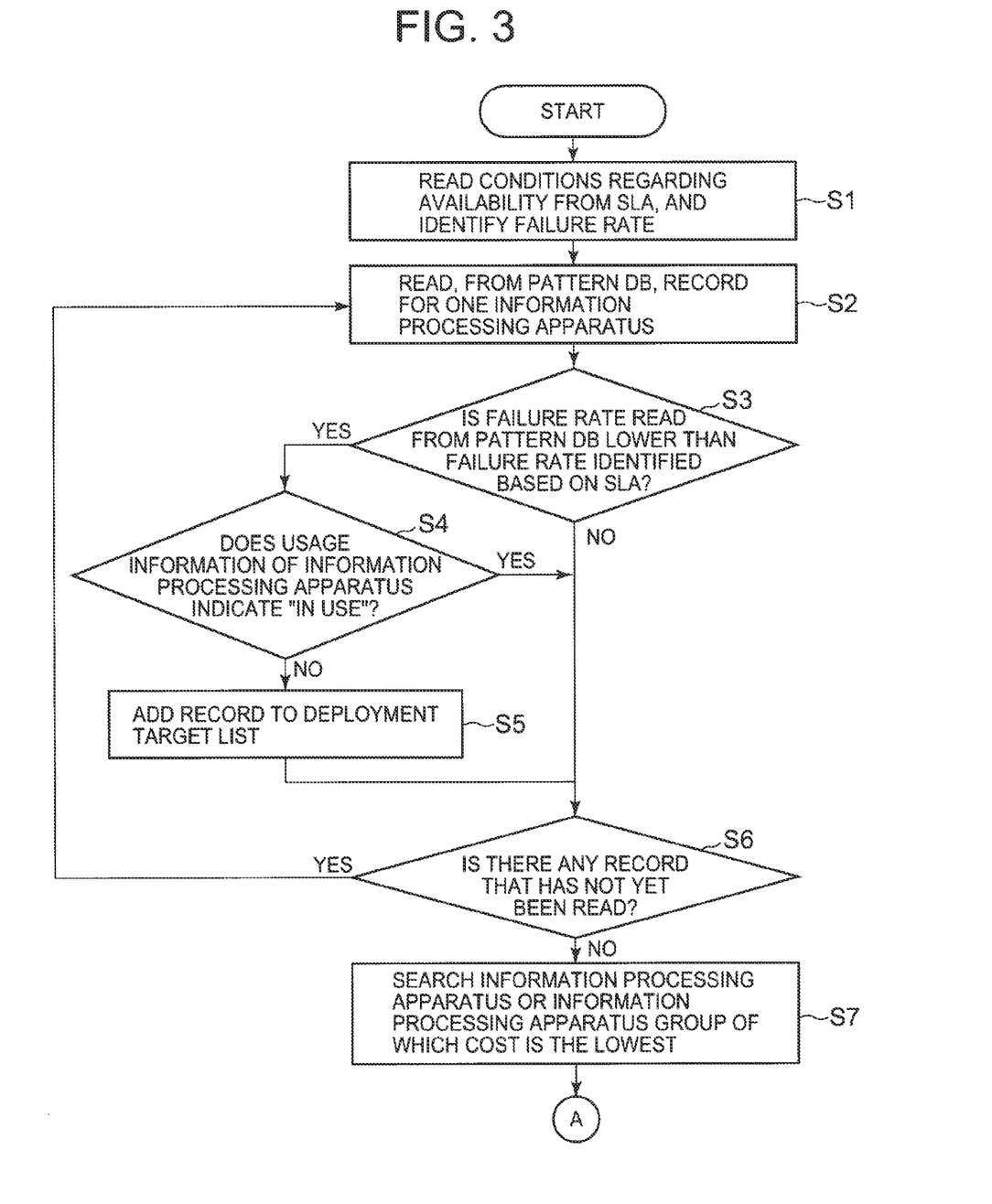
FIG. 3 is a flowchart illustrating an example of process performed by the system deployment determination system.
Figure 4:
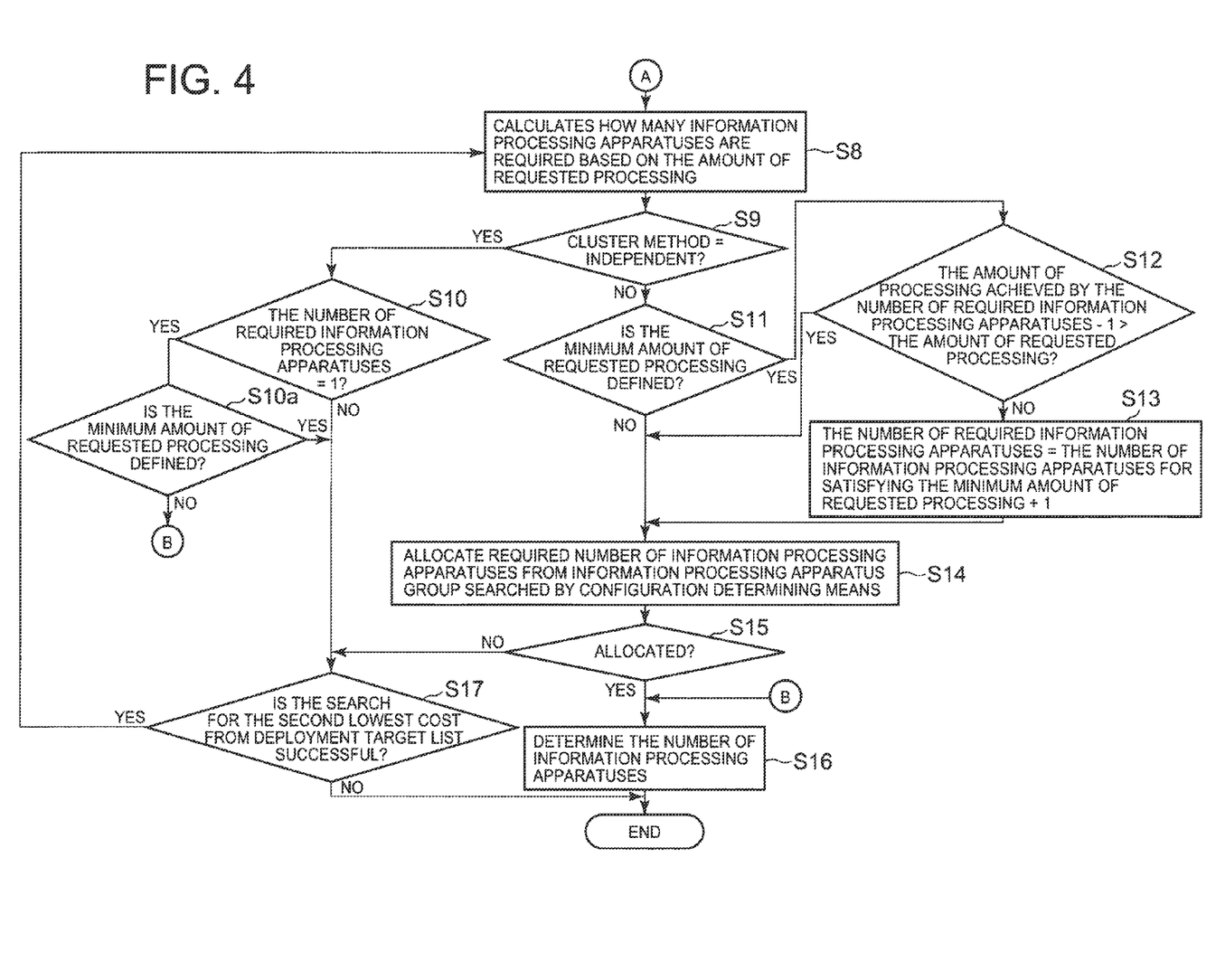
FIG. 4 is a flowchart illustrating an example of process performed by the system deployment determination system.

FIGS. 3 and 4 are flowcharts illustrating examples of processes performed by the system deployment determination system.

When the system deployment determination apparatus 10 receives the SLA 11, the SLA analyzing means 1 reads conditions regarding availability from the SLA 11 received, and identifies a failure rate (step S1). In step S1, the failure rate defined by the SLA 11 may be identified. For example, when the SLA 1 describes the availability, the SLA analyzing means 1 may read the value of the availability, and may calculate the failure rate according to calculation of the expression (1). Alternatively, when the SLA 11 directly describes the failure rate, the SLA analyzing means 1 may read the value of the failure rate. How the failure rate is derived from the SLA 11 is not limited to the above example.

Subsequently, the configuration determining means 2 reads, from the pattern DB stored in the pattern DB storing means 3, a record for one information processing apparatus (in the example shown in FIG. 1, a server which belongs to the server group 5) (step S2).

Then, the configuration determining means 2 determines whether the failure rate included in the record read in step S2 is lower than the failure rate identified based on the SLA in step S1 (step S3). When the failure rate included in the read record is less than the failure rate identified based on SLA 11, this means that the failure rate of the information processing apparatus represented by the read record is less than the specification, and is usable in the target system to be configured. On the contrary, when the failure rate included in the read record is more than the failure rate derived from the SLA 11, this means that the failure rate of the information processing apparatus represented by the read record is more than the specification, and is unusable in the target system to be configured.

When the failure rate included in the read record is less than the failure rate derived from the SLA 11 (Yes in step S3), the configuration determining means 2 looks up the usage information in the record read in step S2, and determines whether the information processing apparatus represented by the record is already used by another system (step S4). In other words, the configuration determining means 2 determines whether the usage information of the information processing apparatus (see FIG. 2) is "in use" or not.

When the information processing apparatus represented by the record read in step S2 is not yet used (No in step S4), the configuration determining means 2 adds the record read in step S2 to the deployment target list (step S5). The deployment target list is a list including records of information processing apparatuses that can be used in the target system to be configured. In the present embodiment, the deployment target list is a list including servers of which failure rates are less than the failure rate derived from the SLA but are not yet used in any system other than the target system to be configured After step S5, the configuration determining means 2 determines whether there is any record that has not yet been read in the pattern DB (step S6).

Alternatively, when the failure rate included in the read record is higher than the failure rate derived from the SLA 11 (No in step S3), or when the information processing apparatus represented by the record read in step S2 is already being used by another system (Yes in step S4), the configuration determining means 2 does not add the record read in step S2 to the deployment target list, and proceeds to step S6, in which a determination is made as to whether there is any record that has not yet read in the pattern DB.

When it is determined that there is a record that has not yet been read in step S6 (Yes in step S6), the configuration determining means 2 repeats the processing of step S2 and subsequent steps. Therefore, in the loop processing of steps S2 to S6, the configuration determining means 2 reads a record for one information processing apparatus, and when the record satisfies the condition for allowing it to be added to the deployment target list, the configuration determining means 2 performs processing for adding the record to the deployment target list. While there remains a record that has not yet read in the pattern DB, the configuration determining means 2 repeats the loop processing starting from step S2.

When it is determined that there is no record that has not yet been read in step S6 (No in step S6), the configuration determining means 2 looks up records in the deployment target list to compare the cost of each information processing apparatus used independently and the cost of each information processing apparatus group forming one cluster, and searches the information processing apparatus (the information processing apparatus used independently) or the information processing apparatus group (information processing apparatus group forming one cluster) of which cost is the lowest (step S7).

Subsequently, apparatus number determining means 4 calculates how many information processing apparatuses (information processing apparatuses used independently or information processing apparatuses which belongs to the information processing apparatus group forming one cluster) searched by the configuration determining means 2 are required to satisfy the amount of requested processing described in the received SLA 11 (step S8). Hereinafter, the number of information processing apparatuses calculated in step S8 will be referred to as the number of required information processing apparatuses.

Subsequently, apparatus number determining means 4 determines whether the information processing apparatus searched by the configuration determining means 2 is an information processing apparatus used independently (step S9). More specifically, a determination is made as to whether the configuration determining means 2 has searched an information processing apparatus used independently or has searched an information processing apparatus group forming one cluster, as an information processing apparatus or an information processing apparatus group of which cost is the lowest.

When the information processing apparatus used independently is searched by the configuration determining means 2 (Yes in step S9), the apparatus number determining means 4 determines whether the number of required information processing apparatuses calculated in step S8 is one or not (step S10). When the number of required information processing apparatuses is one (Yes in step S10), the apparatus number determining means 4 determines whether the received SLA 11 defines the minimum amount of requested processing or not (step S10a). When the SLA 11 does not define the minimum amount of requested processing (No in step S10a), the SLA 11 can be satisfied with only the searched information processing apparatus used independently, and accordingly the apparatus number determining means 4 determines that the number of information processing apparatuses used in the target system to be configured is one, and instructs the information processing apparatus (in this case, one set of information processing apparatus) searched by the configuration determining means 2 to read and activate the VM image (step S16).

On the other hand, when the number of required information processing apparatuses is not one in step S10 (No in step S10), the amount of requested processing cannot be satisfied with the searched information processing apparatus used independently. When the number of required information processing apparatuses is one but the minimum amount of requested processing is defined (Yes in step S10a), the minimum amount of requested processing cannot be satisfied if failure occurs in the information processing apparatus. In these cases, the apparatus number determining means 4 causes the configuration determining means 2 to search, from the deployment target list, an information processing apparatus (information processing apparatus used independently) or an information processing apparatus group (information processing apparatus group forming one cluster) of which cost is the second lowest to the one searched previously. Then, the apparatus number determining means 4 determines whether the search has been completed successfully or not (step S17).

When the search has been successfully made from the deployment target list (Yes in step S17), the apparatus number determining means 4 repeats the processing of step S8 and subsequent steps. When the search from the deployment target list failed (No in step S17), this means that no information processing apparatus that has not yet been searched remains in the deployment target list, and at this occasion, the processing is terminated.

When the information processing apparatus searched by the configuration determining means 2 is determined not to be an information processing apparatus used independently in step S9 (No in step S9), the apparatus number determining means 4 determines whether the received SLA 11 defines the minimum amount of requested processing (step S11). It should be noted that when the information processing apparatus searched by the configuration determining means 2 is not an information processing apparatus used independently, this means that the information processing apparatus group forming one cluster has been searched.

When the minimum amount of requested processing is not defined (No in step S11), the apparatus number determining means 4 determines whether the number of required information processing apparatuses calculated in step S8 can be allocated from the information processing apparatus group searched by the configuration determining means 2 (step S14). When the number of required information processing apparatuses calculated in step S8 cannot be allocated from the configuration determining means 2 group (No in step S15), the processing of step S17 and subsequent steps are performed. For example, when the information processing apparatuses searched by the configuration determining means 2 group are two information processing apparatuses having processing performance of 1000 Tx/S but when the number of required information processing apparatuses is three, the number of required information processing apparatuses cannot be allocated, and accordingly the processing of step S17 and subsequent steps are performed. The processing of step S17 has already been explained, and explanation thereabout will be omitted.

When the number of required information processing apparatuses calculated in step S8 is determined to be able to be allocated from the information processing apparatus group searched by the configuration determining means 2 (Yes in step S15), the apparatus number determining means 4 adopts the number of required information processing apparatuses as the number of information processing apparatuses used in the target system to be configured. Then, from the information processing apparatuses group searched by the configuration determining means 2, the apparatus number determining means 4 instructs as many information processing apparatuses as the number of required information processing apparatuses to read and activate the VM image (step S16).

When the minimum amount of requested processing is determined to be defined in step S11 (Yes in step S11), the apparatus number determining means 4 determines whether a summation of the amount of processing achieved by as many information processing apparatuses as the number of information processing apparatuses obtained by subtracting one from the number of required information processing apparatuses is more than the amount of requested processing defined in the SLA 11 (step S12). The number to subtract (in this case, one) is the number of information processing apparatus that is assumed to fail to operate. More specifically, in step S11, a determination is made as to whether the amount of requested processing can be satisfied even when some of information processing apparatuses among as many information processing apparatuses as the number of required information processing apparatuses fail to operate. In this example, the number of information processing apparatus that is assumed to fail to operate is one. Alternatively, more than one information processing apparatus may be assumed to fail to operate. When the summation of the amount of processing achieved by as many information processing apparatuses as the number of information processing apparatuses obtained by subtracting one from the number of required information processing apparatuses is more than the amount of requested processing defined in the SLA 11 (Yes in step S12), the processing of step S14 and subsequent steps are performed On the other hand, when the summation of the amount of processing achieved by as many information processing apparatuses as the number of information processing apparatuses obtained by subtracting one from the number of required information processing apparatuses is not more than the amount of requested processing defined in the SLA 11 (No in step S12), the apparatus number determining means 4 calculates how many information processing apparatuses which belong to the information processing apparatus group searched by the configuration determining means 2 are required to satisfy the minimum amount of requested processing described in the received SLA 11, and adopts the number obtained by adding one to the number of information processing apparatuses as the number of required information processing apparatuses (step S13). More specifically, in step S13, the number of required information processing apparatuses calculated in step S8 is updated. It should be noted that the added number in step S13 (in this example, one) is the number of information processing apparatus that is assumed to fail to operate. Subsequently, the apparatus number determining means 4 performs the processing of step S14 and subsequent steps.

The processing of step S14 and subsequent steps have already been explained, and explanation thereabout will be omitted.

It should be noted that the information processing apparatus having read the VM file and been activated in accordance with the instruction given by the apparatus number determining means 4 in step S16 operates in accordance with the VM file.

Subsequently, operation of the present invention will be explained using a specific example. In a specific example explained below, the pattern DB storing means 3 stores a pattern DB as shown in FIG. 2 for example.

First, an example where the SLA 11 does not describe the minimum amount of requested processing will be explained. For example, it is assumed that the system deployment determination apparatus 10 receives an SLA 11 defining that the availability is 95% and the amount of requested processing is 700 Tx/S. Then, the SLA analyzing means 1 calculates as follows: 100−95=5. As a result, the SLA analyzing means 1 derives that the failure rate required of the target system to be configured is 5% or less (step S1).

Figure 5:
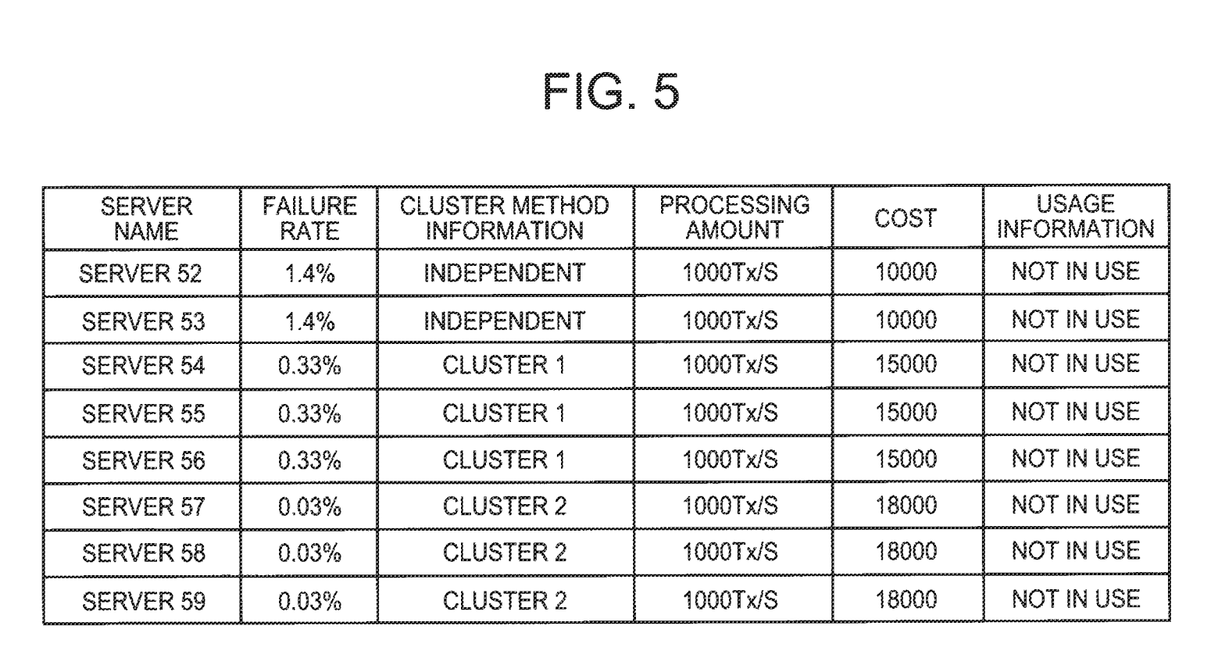
FIG. 5 is an explanatory diagram illustrating an example of deployment target list.

Subsequently, the configuration determining means 2 reads a record for one information processing apparatus from the pattern DB, and when the failure rate of the information processing apparatus is less than 5%, and the information processing apparatus is not yet used by any other system, the configuration determining means 2 adds the record to the deployment target list. By repeating this processing, the configuration determining means 2 generates the deployment target list (step S2 to S6). In this example, records other than the server 51 as shown in FIG. 2 are added to the deployment target list, and as a result, the deployment target list as shown in FIG. 5 as an example is obtained.

Subsequently, the configuration determining means 2 looks up records in the deployment target list to compare the cost of each information processing apparatus used independently and the cost of each information processing apparatus group forming one cluster, and searches the information processing apparatus or the information processing apparatus group of which cost is the lowest (step S7). In the example as shown in FIG. 5, the cost of each of the servers 52, 53 is 10000. On the other hand, the cost of the information processing apparatus group (servers 54 to 56) forming the cluster 1 is 45000 (=15000×3). The cost of the information processing apparatus group (servers 57 to 59) forming the cluster 2 is 54000 (=18000×3). Therefore, the configuration determining means 2 may adopt the server 52 or the server 53 as a search result. In this case, the server 52 is adopted as the search result, for example.

Subsequently, the apparatus number determining means 4 calculates the number of servers 52 required to satisfy the amount of requested processing "700 Tx/S" defined in the received SLA 11. Since the amount of processing of the server 52 is "1000 Tx/S", the apparatus number determining means 4 determines that the amount of requested processing can be satisfied with only one server 52 (step S8).

Subsequently, the apparatus number determining means 4 determines, on the basis of the cluster method information, that the searched server 52 is an information processing apparatus used independently (Yes in step S9), step S10 is subsequently performed. The number of required information processing apparatus calculated in step S8 is one (Yes in step S10), and the minimum amount of requested processing is not defined in the SLA 11 (No in step S10*a*). Therefore, the apparatus number determining means 4 determines that the number of information processing apparatus used in the target system to be configured is one set of "server 52", and instructs the server 52 to read and activate the VM image (step S16).

Subsequently, an example where the SLA 11 describes the minimum amount of requested processing will be explained. For example, it is assumed that the system deployment determination apparatus 10 receives an SLA 11 defining that the availability is 99%, the amount of requested processing is 1000 Tx/S, and the minimum amount of requested processing is 500 Tx. Then, the SLA analyzing means 1 performs calculation as follows, 100−99=1. As a result, the SLA analyzing means 1 derives that the failure rate required of the target system to be configured is less than 1% (step S1).

Subsequently, the configuration determining means 2 reads a record for one information processing apparatus from the pattern DB, and when the failure rate of the information processing apparatus is less than 1%, and the information processing apparatus is not yet used by any other system, the configuration determining means 2 adds the record to the deployment target list. By repeating this processing, the configuration determining means 2 generates the deployment target list (step S2 to S6). In this example, records other than the servers 51 to 53 shown in FIG. 2 are added to the deployment target list, and as a result, the deployment target list shown in FIG. 6 as an example is obtained. In the example shown in FIG. 6, only the servers forming the cluster are added to the deployment target list.

Subsequently, the configuration determining means 2 searches the information processing apparatus group of which cost is the lowest (step S7). In the example shown in FIG. 6, the cost of the information processing apparatus group (servers 54 to 56) forming the cluster 1 is 45000 (=15000×3). The cost of the information processing apparatus group (servers 57 to 59) forming the cluster 2 is 54000 (=18000×3). Therefore, the configuration determining means 2 adopts the servers 54 to 56 as a search result.

Figure 6:
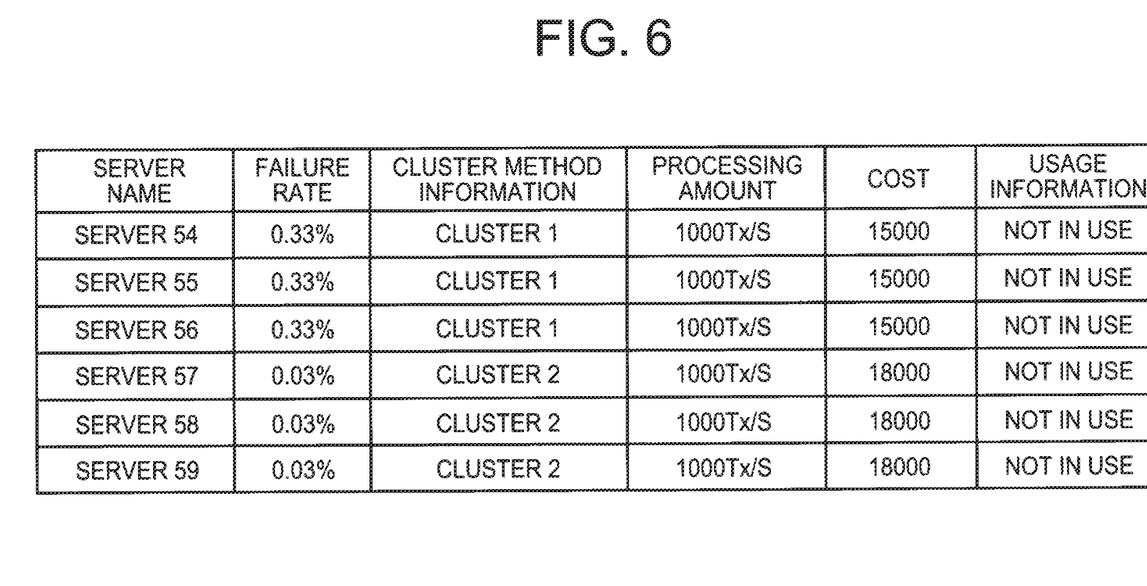
FIG. 6 is an explanatory diagram illustrating an example of deployment target list.

Subsequently, apparatus number determining means 4 calculates the number of servers required to satisfy the amount of requested processing "1000 Tx/S" defined in the received SLA 11. Since the amount of processing of any one of the servers 54 to 56 is "1000 Tx/S", the apparatus number determining means 4 determines that the amount of requested processing can be satisfied with only one of the servers thus searched (step S8).

Subsequently, the apparatus number determining means 4 determines, on the basis of the cluster method information, that the searched servers 54 to 56 are information processing apparatuses used as the cluster (No in step S9), and step S11 is subsequently performed. Since the SLA 11 defines the minimum amount of requested processing (Yes in step S11), step S12 is subsequently performed.

In step S12, the apparatus number determining means 4 determines whether a summation of the amount of processing achieved by as many information processing apparatuses as the number of information processing apparatuses obtained by subtracting one from the number of required information processing apparatus calculated in step S8 (one) is more than the amount of requested processing defined in the SLA 11. In this case, one subtracted from the number of required information processing apparatuses (one) leaves zero, and the amount of processing that can be processed is also zero. Therefore, it is determined that the amount of processing is less than the amount of requested processing "1000 Tx/S", and step S13 is subsequently performed.

In step S13, the apparatus number determining means 4 calculates the number of information processing apparatuses required with which the minimum amount of requested processing "500 Tx/S" defined in the received SLA 11 is satisfied. Since the amount of processing of any one of the servers 54 to 56 thus searched is "1000 Tx/S", the apparatus number determining means 4 determines that the minimum amount of requested processing can be satisfied with only one of the servers thus searched. Then, "two" obtained by adding one to the number of information processing apparatus (one) is adopted as the number of required information processing apparatuses (step S13).

Subsequently, the apparatus number determining means 4 determines that two information processing apparatuses calculated in step S13 can be allocated from the searched servers 54 to 56 (step S14, Yes in step S15). Then, the apparatus number determining means 4 determines that two of the servers 54 to 56 (in this case, the servers 54, 55) are used for the target system to be configured (step S16). Then, apparatus number determining means 4 instructs the servers 54, 55 to read and activate the VM image. In this case, the servers 54, 55 are selected, for example. However, a combination of two servers selected in step S16 is not limited to the servers 54, 55.

According to the present invention, the number of information processing apparatuses used in the target system to be configured is determined on the basis of the failure rate and the amount of requested processing defined by the SLA and the failure rate and the amount of processing of each of the information processing apparatuses, and therefore, the number of information processing apparatuses can be appropriately defined so as to satisfy the availability defined in the SLA. When the SLA defines the minimum amount of requested processing, it is possible to determine the number of information processing apparatuses with which the minimum amount of requested processing can be maintained even if failure occurs in some of information processing apparatuses, and therefore, it is also possible to determine the number of information processing apparatuses with which the minimum amount of requested processing is satisfied.

In addition, according to the above embodiment, the server group (information processing apparatus group) is connected to the system deployment determination apparatus 10, and the system deployment determination apparatus 10 instructs the information processing apparatus to read the VM file. In this configuration, each information processing apparatus determined to be used in the target system to be configured can be caused to execute operation as the target system to be configured.

In addition, according to the above embodiment, for example, the information processing apparatus reads the VM file and operates according to the VM file in accordance with the instruction given by the system deployment determination apparatus 10. Instead of using the VM file, the information processing apparatus may install an OS and software in accordance with an instruction given by the system deployment determination apparatus 10, and may operate according to the OS and the software.

Still alternatively, instead of the VM file, a copy of a hard disk and the like in which an OS and the like has already been installed may be used.

Even if the server group is not connected to the system deployment determination apparatus 10, the system deployment determination apparatus 10 may be configured to perform at least processing up to the processing for determining the number of information processing apparatuses used in the target system to be configured.

Figure 7:
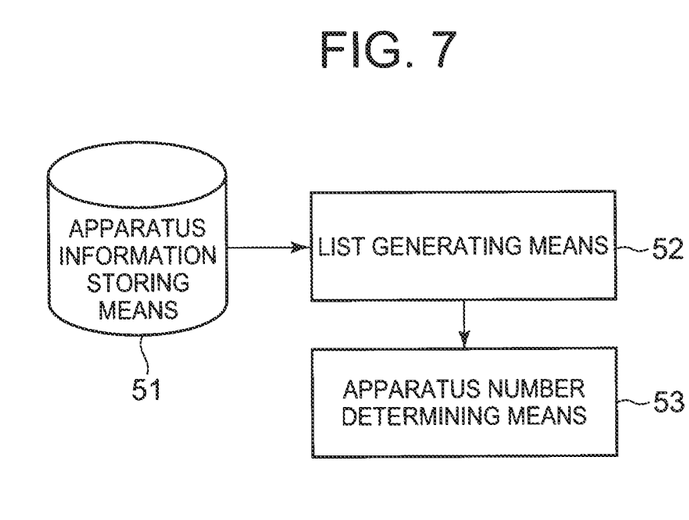
FIG. 7 is a block diagram illustrating an example of minimum configuration of the present invention.

Subsequently, the minimum configuration of the present invention will be explained. FIG. 7 is a block diagram illustrating an example of minimum configuration of the present invention. The system deployment determination system according to the present invention includes apparatus information storing means 51, list generating means 52, and apparatus number determining means 53.

The apparatus information storing means 51 (for example, pattern DB storing means 3) stores a record including, for each candidate information processing apparatus that may be employed by the target system to be configured, a failure rate, cluster method information indicating whether the information processing apparatus is used independently or used in a cluster, an amount of processing, and a cost, i.e., an index value representing the price.

When the list generating means 52 (for example, configuration determining means 2) receives a Service Level Agreement including information with which a failure rate defined for the target system to be configured can be derived (for example, the value of availability) and an amount of requested processing during normal operation, i.e., an amount of processing required of the target system to be configured during normal operation (for example, the amount of requested processing according to the embodiment), the list generating means 52 generates at least a list including information processing apparatuses of which failure rates are less than the failure rate defined for the target system to be configured (for example, the deployment target list), and searches, from the list, an information processing apparatus used independently or an information processing apparatus group forming a cluster of which cost is the lowest.

The apparatus number determining means 53 (for example, apparatus number determining means 4) calculates a number of information processing apparatuses required to satisfy the amount of requested processing during normal operation on the basis of the amount of requested processing during normal operation and an amount of processing performed by the information processing apparatus used independently or the information processing apparatus group forming a cluster searched by the list generating means 52 (for example, step S8 is executed). On condition that the number of information processing apparatuses thus calculated can be allocated from among the information processing apparatuses used independently or the information processing apparatus group forming the cluster searched by the list generating means 52 (for example, Yes in step S15), the number of information processing apparatuses thus calculated is adopted as the number of information processing apparatuses used in the target system to be configured. When the number of information processing apparatuses thus calculated cannot be allocated from among the information processing apparatuses used independently or the information processing apparatus group forming the cluster searched by the list generating means 52 (for example, No in step S15), the list generating means 52 is caused to search, from among information processing apparatuses or information processing apparatus groups that have not yet been searched, an information processing apparatuses used independently or an information processing apparatus group forming a cluster of which cost is the lowest (for example, step S17 is performed).

In this configuration, the system deployment determination system according to the present invention determines the number of information processing apparatuses used in the target system to be configured in view of the failure rate and the amount of requested processing defined in the SLA and the failure rate and the amount of processing of each of the information processing apparatuses, and therefore, the system deployment determination system according to the present invention can appropriately determine the number of information processing apparatuses with which the availability defined in the SLA is satisfied.

In the above embodiment, distinctive configurations of the system deployment determination system as described in the items (1) to (10) below are shown.

(1) A system deployment determination system includes apparatus information storing means (for example, the pattern DB storing means 3) for storing, for each candidate information processing apparatus that may be employed by a target system to be configured, a record including a failure rate, cluster method information indicating whether the information processing apparatus is used independently or used in a cluster, an amount of processing, and a cost as an index value representing a price, list generating means (for example, the configuration determining means 2), wherein when a Service Level Agreement is given that includes information (for example, the value of availability) with which a failure rate defined for the target system to be configured can be derived and an amount of requested processing during normal operation (for example, the amount of requested processing according to the embodiment), i.e., an amount of processing required of the target system to be configured during normal operation, the list generating means generates at least a list (for example, the deployment target list) including information processing apparatuses of which failure rates are less than the failure rate defined for the target system to be configured, and searches, from the list, an information processing apparatus used independently or an information processing apparatus group forming a cluster of which cost is the lowest, and apparatus number determining means (for example, the apparatus number determining means 4) for calculating (for example, executing step S8) a number of information processing apparatuses required to satisfy the amount of requested processing during normal operation on the basis of the amount of requested processing during normal operation and an amount of processing performed by the information processing apparatus used independently or the information processing apparatus group forming the cluster searched by the list generating means, wherein on condition that the number of information processing apparatuses thus calculated can be allocated from among the information processing apparatus used independently or the information processing apparatus group forming the cluster searched by the list generating means (for example, Yes in step S15), the apparatus number determining means determines that the number of information processing apparatuses thus calculated is the number of information processing apparatuses used in the target system to be configured, and when the number of information processing apparatuses thus calculated cannot be allocated from among the information processing apparatus used independently or the information processing apparatus group forming the cluster searched by the list generating means (for example, No in step S15), the apparatus number determining means causes the list generating means to search, from among an information processing apparatus or an information processing apparatus group that has not yet been searched, an information processing apparatus used independently or an information processing apparatus group forming a cluster of which cost is the lowest (for example, performing step S17).

(2) The system deployment determination system may be configured such that when the Service Level Agreement defines an minimum amount of requested processing, i.e., an amount of processing required as an amount of processing that should be processed by the target system to be configured even if failure occurs in some information processing apparatus in the target system to be configured, and the amount of requested processing during normal operation cannot be satisfied if a number of information processing apparatuses assumed to be a number of malfunctioning information processing apparatuses is subtracted from the number of information processing apparatuses required to satisfy the amount of requested processing during normal operation (for example, No in step S12), then the apparatus number determining means calculates (for example, execute step S13) a number of information processing apparatuses by adding the number of information processing apparatuses assumed to be the number of malfunctioning information processing apparatuses to the number of information processing apparatuses required to satisfy the minimum amount of requested processing, and on condition that the number of information processing apparatuses thus calculated can be allocated from the information processing apparatus group forming the cluster searched by the list generating means, the number of information processing apparatuses thus calculated is adopted as the number of information processing apparatuses used in the target system to be configured, and when the number of information processing apparatuses thus calculated cannot be allocated from the information processing apparatus group forming the cluster searched by the list generating means, the apparatus number determining means causes the list generating means to search, from among an information processing apparatus or an information processing apparatus group that has not yet been searched, an information processing apparatus used independently or an information processing apparatus group forming a cluster of which cost is the lowest.

(3) The system deployment determination system may be configured such that the apparatus information storing means stores a record including information (for example, the usage information) indicating as to whether the information processing apparatus is already being used, and the list generating means generates a list including information processing apparatuses of which failure rates are less than the failure rate defined for the target system to be configured and which are not being used. According to such configuration, information processing apparatuses already being used are prevented from being included in the number of information processing apparatuses used in the target system to be configured.

(4) The system deployment determination system may be configured to include each candidate information processing apparatus that may be employed by the target system to be configured, wherein the apparatus number determining means instructs an information processing apparatus determined to be used in the target system to be configured to operate according to the target system to be configured. According to such configuration, each information processing apparatus determined to be used in the target system to be configured can be caused to execute operation as the target system to be configured.

(5) The system deployment determination system may be configured to include instruction group storing means (for example, the VM image storing means 6) for storing an instruction group (for example, the VM image) with which the information processing apparatus is caused to execute operation according to the target system to be configured, wherein the apparatus number determining means instructs the information processing apparatus determined to be used in the target system to be configured to read the instruction group from the instruction group storing means and operate according to the target system to be configured based on the instruction group.

(6) A system deployment determination system includes an apparatus information storing unit (for example, the pattern DB storing means 3) for storing, for each candidate information processing apparatus that may be employed by a target system to be configured, a record including a failure rate, cluster method information indicating whether the information processing apparatus is used independently or used in a cluster, an amount of processing, and a cost as an index value representing a price, a list generating unit (for example, the configuration determining means 2), wherein when a Service Level Agreement is given that includes information (for example, the value of availability) with which a failure rate defined for the target system to be configured can be derived and an amount of requested processing during normal operation (for example, the amount of requested processing according to the embodiment), i.e., an amount of processing required of the target system to be configured during normal operation, the list generating unit generates at least a list (for example, the deployment target list) including information processing apparatuses of which failure rates are less than the failure rate defined for the target system to be configured, and searches, from the list, an information processing apparatus used independently or an information processing apparatus group forming a cluster of which cost is the lowest, and an apparatus number determining unit (for example, the apparatus number determining means 4) for calculating (for example, executing step S8) a number of information processing apparatuses required to satisfy the amount of requested processing during normal operation on the basis of the amount of requested processing during normal operation and an amount of processing performed by the information processing apparatus used independently or the information processing apparatus group forming the cluster searched by the list generating unit, wherein on condition that the number of information processing apparatuses thus calculated can be allocated from among the information processing apparatus used independently or the information processing apparatus group forming the cluster searched by the list generating unit (for example, Yes in step S15), the apparatus number determining unit determines that the number of information processing apparatuses thus calculated is the number of information processing apparatuses used in the target system to be configured, and when the number of information processing apparatuses thus calculated cannot be allocated from among the information processing apparatus used independently or the information processing apparatus group forming the cluster searched by the list generating unit (for example, No in step S15), the apparatus number determining unit causes the list generating unit to search, from among an information processing apparatus or an information processing apparatus group that has not yet been searched, an information processing apparatus used independently or an information processing apparatus group forming a cluster of which cost is the lowest (for example, performing step S17).

(7) The system deployment determination system may be configured such that when the Service Level Agreement defines an minimum amount of requested processing, i.e., an amount of processing required as an amount of processing that should be processed by the target system to be configured even if failure occurs in some information processing apparatus in the target system to be configured, and the amount of requested processing during normal operation cannot be satisfied if a number of information processing apparatuses assumed to be a number of malfunctioning information processing apparatuses is subtracted from the number of information processing apparatuses required to satisfy the amount of requested processing during normal operation (for example, No in step S12), then the apparatus number determining unit calculates (for example, execute step S13) a number of information processing apparatuses by adding the number of information processing apparatuses assumed to be the number of malfunctioning information processing apparatuses to the number of information processing apparatuses required to satisfy the minimum amount of requested processing, and on condition that the number of information processing apparatuses thus calculated can be allocated from the information processing apparatus group forming the cluster searched by the list generating unit, the number of information processing apparatuses thus calculated is adopted as the number of information processing apparatuses used in the target system to be configured, and when the number of information processing apparatuses thus calculated cannot be allocated from the information processing apparatus group forming the cluster searched by the list generating unit, the apparatus number determining unit causes the list generating unit to search, from among an information processing apparatus or an information processing apparatus group that has not yet been searched, an information processing apparatus used independently or an information processing apparatus group forming a cluster of which cost is the lowest.

(8) The system deployment determination system may be configured such that the apparatus information storing unit stores a record including information (for example, the usage information) indicating as to whether the information processing apparatus is already being used, and the list generating unit generates a list including information processing apparatuses of which failure rates are less than the failure rate defined for the target system to be configured and which are not being used.

(9) The system deployment determination system may be configured to include each candidate information processing apparatus that may be employed by the target system to be configured, wherein the apparatus number determining unit instructs an information processing apparatus determined to be used in the target system to be configured to operate according to the target system to be configured.

(10) The system deployment determination system may be configured to include an instruction group storing unit (for example, the VM image storing means 6) for storing an instruction group (for example, the VM image) with which the information processing apparatus is caused to execute operation according to the target system to be configured, wherein the apparatus number determining unit instructs the information processing apparatus determined to be used in the target system to be configured to read the instruction group from the instruction group storing unit and operate according to the target system to be configured based on the instruction group.

The invention of the present application has been hereinabove explained with reference to the embodiment. However, the invention of the present application is not limited to the above embodiment. The configuration and details of the invention of the present application may be changed in various ways, which can be understood by a person skilled in the art, within the scope of the invention of the present application.

This application claims priority based on Japanese Patent Application No. 2009-248950 filed on Oct. 29, 2009, and all the disclosures thereof are incorporated herein by reference.

INDUSTRIAL APPLICABILITY

The present invention can be preferably applied to a system deployment determination system for determining the number of information processing apparatuses used in a target system to be configured. The present invention can be applied to a system deployment determination system for determining the number of information processing apparatuses used for PAAS (Platform As A Service) and a large-scale system such as a data center, for example.

REFERENCE SIGNS LIST

1 SLA analyzing means
2 Configuration determining means
3 Pattern DB storing means
4 Apparatus number determining means
5 Server group
6 VM image storing means
10 System deployment determination apparatus

The invention claimed is:

1. A system deployment determination system comprising:
at least one processor;
an apparatus information storing unit for storing, for each candidate information processing apparatus that may be employed by a target system to be configured, a record including a failure rate, cluster method information indicating whether the information processing apparatus is used independently or used in a cluster, an amount of processing, and a cost as an index value representing a price;
a list generating unit, wherein when a Service Level Agreement is given that includes information with which a failure rate defined for the target system to be configured can be derived and an amount of requested processing during normal operation which is an amount of processing required of the target system to be configured during normal operation, the list generating unit generates at least a list including information processing apparatuses, of which failure rates are less than the failure rate defined, within the information, for the target system to be configured, and searches, from the list, an information processing apparatus used independently or an information processing apparatus group forming a cluster of which cost is the lowest; and
an apparatus number determining unit for calculating a number of information processing apparatuses required to satisfy the amount of requested processing during normal operation on the basis of the amount of requested processing during normal operation and an amount of processing performed by the information processing apparatus used independently or the information processing apparatus group forming the cluster searched by the list generating unit, wherein on condition that the number of information processing apparatuses thus calculated can be allocated from among the information processing apparatus used independently or the information processing apparatus group forming the cluster searched by the list generating unit, the apparatus number determining unit determines that the number of information processing apparatuses thus calculated is the number of information processing apparatuses used in the target system to be configured, and when the number of information processing apparatuses thus calculated cannot be allocated from among the information processing apparatus used independently or the information processing apparatus group forming the cluster searched by the list generating unit, the apparatus number determining unit causes the list generating unit to search, from among an information processing apparatus or an information processing apparatus group that has not yet been searched, an information processing apparatus used independently or an information processing apparatus group forming a cluster of which cost is the lowest.

2. The system deployment determination system according to claim 1, wherein when the Service Level Agreement defines a minimum amount of requested processing which is an amount of processing required as an amount of processing that should be processed by the target system to be configured even if failure occurs in some information processing apparatus in the target system to be configured, and the amount of requested processing during normal operation cannot be satisfied if a number of information processing apparatuses assumed to be a number of malfunctioning information processing apparatuses is subtracted from the number of information processing apparatuses required to satisfy the amount of requested processing during normal operation, then the apparatus number determining unit calculates a number of information processing apparatuses by adding the number of information processing apparatuses assumed to be the number of malfunctioning information processing apparatuses to the number of information processing apparatuses required to satisfy the minimum amount of requested processing, and on condition that the number of information processing apparatuses thus calculated can be allocated from the information processing apparatus group forming the cluster searched by the list generating unit, the number of information processing apparatuses thus calculated is adopted as the number of information processing apparatuses used in the target system to be configured, and when the number of information processing apparatuses thus calculated cannot be allocated from the information processing apparatus group forming the cluster searched by the list generating unit, the apparatus number determining unit causes the list generating unit to search, from among an information processing apparatus or an information processing apparatus group that has not yet been searched, an information processing apparatus used independently or an information processing apparatus group forming a cluster of which cost is the lowest.

3. The system deployment determination system according to claim 1, wherein the apparatus information storing unit stores a record including information indicating as to whether the information processing apparatus is already being used, and the list generating unit generates a list including information processing apparatuses of which failure rates are less than the failure rate defined for the target system to be configured and which are not being used.

4. The system deployment determination system according to claim 1 comprising each candidate information processing apparatus that may be employed by the target system to be configured, wherein the apparatus number determining unit instructs an information processing apparatus determined to be used in the target system to be configured to operate according to the target system to be configured.

5. The system deployment determination system according to claim 4 comprising an instruction group storing unit for storing an instruction group with which the information processing apparatus is caused to execute operation according to the target system to be configured, wherein the apparatus number determining unit instructs the information processing apparatus determined to be used in the target system to be configured to read the instruction group from the instruction group storing unit and operate according to the target system to be configured based on the instruction group.

6. A system deployment determination method comprising:

storing, for each candidate information processing apparatus that may be employed by a target system to be configured, a record including a failure rate, cluster method information indicating whether the information processing apparatus is used independently or used in a cluster, an amount of processing, and a cost as an index value representing a price;

when a Service Level Agreement is given that includes information with which a failure rate defined for the target system to be configured can be derived and an amount of requested processing during normal operation which is an amount of processing required of the target system to be configured during normal operation, generating at least a list including information processing apparatuses, of which failure rates are less than the failure rate defined, within the information, for the target system to be configured, and searching, from the list, an information processing apparatus used independently or an information processing apparatus group forming a cluster of which cost is the lowest; and calculating a number of information processing apparatuses required to satisfy the amount of requested processing during normal operation on the basis of the amount of requested processing during normal operation and an amount of processing performed by the searched information processing apparatus used independently or the searched information processing apparatus group forming a cluster, wherein on condition that the number of information processing apparatuses thus calculated can be allocated from among the searched information processing apparatus used independently or the searched information processing apparatus group forming the cluster, the number of information processing apparatuses thus calculated is adopted as the number of information processing apparatuses used in the target system to be configured, and when the number of information processing apparatuses thus calculated cannot be allocated from among the searched information processing apparatus used independently or the searched information processing apparatus group forming the cluster, an information processing apparatus used independently or an information processing apparatus group forming a cluster of which cost is the lowest is searched from among an information processing apparatus or an information processing apparatus group that has not yet been searched.

7. The system deployment determination method according to claim 6, wherein when the Service Level Agreement defines a minimum amount of requested processing which is an amount of processing required as an amount of processing that should be processed by the target system to be configured even if failure occurs in some information processing apparatus in the target system to be configured, and the amount of requested processing during normal operation cannot be satisfied if a number of information processing apparatuses assumed to be a number of malfunctioning information processing apparatuses is subtracted from the number of information processing apparatuses required to satisfy the amount of requested processing during normal operation, then a number of information processing apparatuses is calculated by adding the number of information processing apparatuses assumed to be the number of malfunctioning information processing apparatuses to the number of information processing apparatuses required to satisfy the minimum amount of requested processing, and on condition that the number of information processing apparatuses thus calculated can be allocated from the searched information processing apparatus group forming the cluster, the number of information processing apparatuses thus calculated is adopted as the number of information processing apparatuses used in the target system to be configured, and when the number of information processing apparatuses thus calculated cannot be allocated from the searched information processing apparatus group forming the cluster, an information processing apparatus used independently or an information processing apparatus group forming a cluster of which cost is the lowest is searched from among an information processing apparatus or an information processing apparatus group that has not yet been searched again.

8. A non-transitory computer readable information recording medium storing a system deployment determination program, when executed by a processor having an apparatus information storing unit for storing, for each candidate information processing apparatus that may be employed by a target system to be configured, a record including a failure rate, cluster method information indicating whether the information processing apparatus is used independently or used in a cluster, an amount of processing, and a cost as an index value representing a price, performs a method for:

when a Service Level Agreement is given that includes information with which a failure rate defined for the target system to be configured can be derived and an amount of requested processing during normal operation which is an amount of processing required of the target system to be configured during normal operation, generating at least a list including information processing apparatuses, of which failure rates are less than the failure rate defined, within the information, for the target system to be configured, and searching, from the list, an information processing apparatus used independently or an information processing apparatus group forming a cluster of which cost is the lowest; and calculating a number of information processing apparatuses required to satisfy the amount of requested processing during normal operation on the basis of the amount of requested processing during normal operation and an amount of processing performed by the searched information processing apparatus used independently or the searched information processing apparatus group forming a cluster, wherein on condition that the number of information processing apparatuses thus calculated can be allocated from among the searched information processing apparatus used independently or the searched information processing apparatus group forming the cluster, the number of information processing apparatuses thus calculated is adopted as the number of information processing apparatuses used in the target system to be configured, and when the number of information processing apparatuses thus calculated cannot be allocated from among the searched information processing apparatus used independently or the searched information processing apparatus group forming the cluster, an information processing apparatus used independently or an information processing apparatus group forming a cluster of which cost is the lowest is searched from among an information processing apparatus or an information processing apparatus group that has not yet been searched.

9. The non-transitory computer readable information recording medium storing the system deployment determination program according to claim 8, wherein when executed by the processor, performs the method for:

when the Service Level Agreement defines a minimum amount of requested processing which is an amount of processing required as an amount of processing that should be processed by the target system to be configured even if failure occurs in some information processing apparatus in the target system to be configured, and the amount of requested processing during normal operation cannot be satisfied if a number of information processing apparatuses assumed to be a number of malfunctioning information processing apparatuses is subtracted from the number of information processing apparatuses required to satisfy the amount of requested processing during normal operation, then a number of information processing apparatuses is calculated by adding the number of information processing apparatuses assumed to be the number of malfunctioning information processing apparatuses to the number of information processing apparatuses required to satisfy the minimum amount of requested processing, and on condition that the number of information processing apparatuses thus calculated can be allocated from the searched information processing apparatus group forming the cluster, the number of information processing apparatuses thus calculated is adopted as the number of information processing apparatuses used in the target system to be configured, and when the number of information processing apparatuses thus calculated cannot be allocated from the searched information processing apparatus group forming the cluster, an information processing apparatus used independently or an information processing apparatus group forming a cluster of which cost is the lowest is searched from among an information processing apparatus or an information processing apparatus group that has not yet been searched again.

* * * * *